E. E. BROWN.
MACHINE FOR WORKING PLASTIC MATERIALS.
APPLICATION FILED MAR. 31, 1917.
1,246,048.
Patented Nov. 13, 1917.
3 SHEETS—SHEET 2.
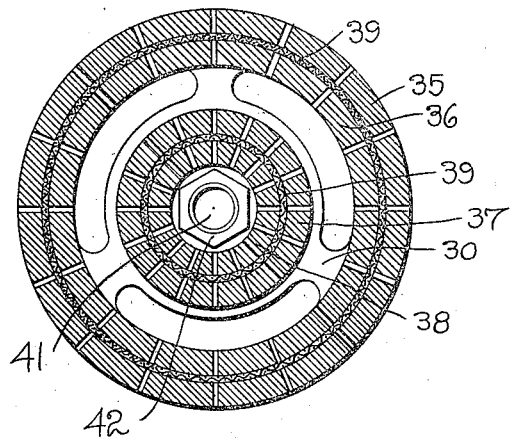
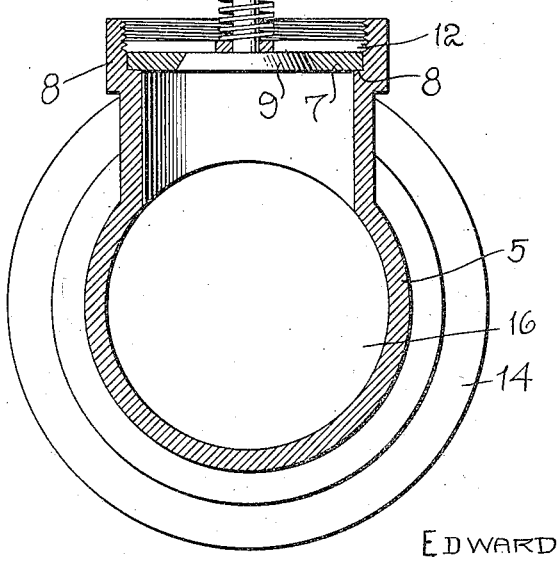
Inventor
EDWARD E. BROWN
By Watson E. Coleman
Attorney

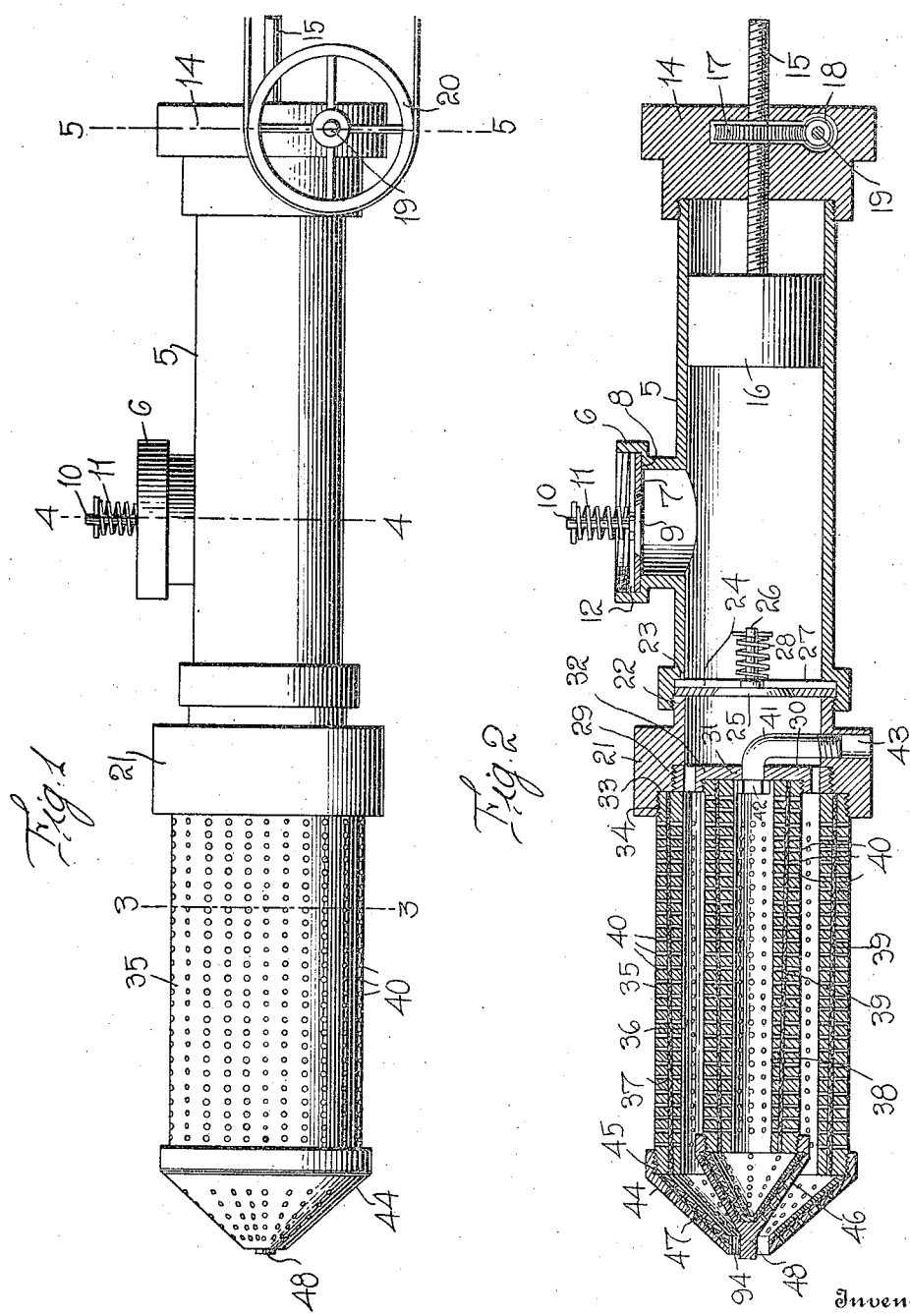

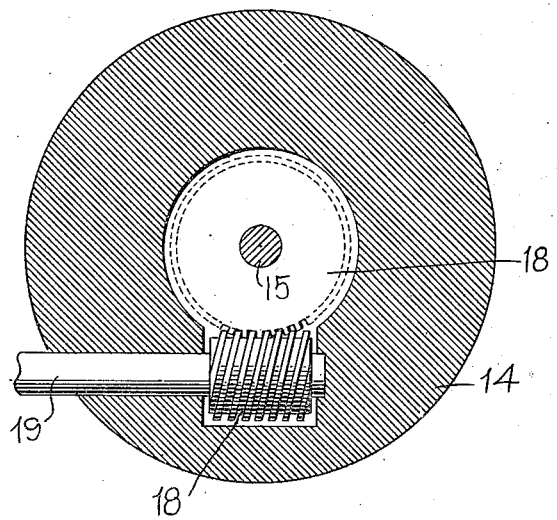
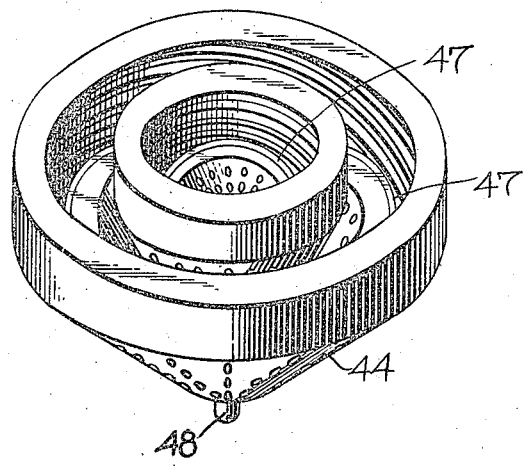

UNITED STATES PATENT OFFICE.

EDWARD E. BROWN, OF DETROIT, MICHIGAN.

MACHINE FOR WORKING PLASTIC MATERIALS.

1,246,048.  Specification of Letters Patent.  Patented Nov. 13, 1917.

Application filed March 31, 1917. Serial No. 158,897.

*To all whom it may concern:*

Be it known that I, EDWARD E. BROWN, a citizen of the United States, residing at Detroit, in the county of Wayne and State of Michigan, have invented certain new and useful Improvements in Machines for Working Plastic Materials, of which the following is a specification, reference being had to the accompanying drawings.

This invention relates to an improved machine for working clay or other plastic materials used in the manufacture of pottery, building blocks, and for various other purposes. The process now in general use in the art for converting the plastic material into a desired shape or form, whereby it can be made into the manufactured article, involves the use of flint stone, feldspar, china, or ball clay, or other suitable plastic material, and a stain such as cobalt mixed therewith. These ingredients are first thoroughly ground in a suitable mill and then agitated until thoroughly mixed, water being added during such agitation so as to produce a thick, miscible mass. This mass is pumped out of the container and passed over a suitable sifting screen to remove the rough or unground particles, after which the mass is passed into a filter press. By the application of pressure, the mass is forced through one or more filters so as to extract the water, leaving the material in the form of a plastic cake or in a doughy condition so that it may be easily handled or manipulated. This clay dough is now passed through another machine known in the art as a pug mill which tempers the clay and renders the same of uniform consistency, at the same time discharging the clay in particles of various forms or shapes.

It is the primary object of the present invention to eliminate the necessity of passing the plastic material through separate filtering and pugging machines, and to perform both of these operations in the passage of the material under pressure through a single machine.

It is another important object of the invention to provide a machine of the character stated, having improved filtering means whereby the water is thoroughly filtered from the plastic mass.

The invention has for another important object to provide improved means for converting the de-filtered mass of plastic material into a desired cross-sectional shape or form as it is discharged from the machine.

And it is a further general object of my invention to improve and simplify the construction of machines for the purpose stated, whereby the same is rendered highly efficient and reliable in its operation and may also be manufactured at relatively small cost.

With the above and other objects in view, my invention consists in the novel features of construction, combination, and arrangement of parts to be hereinafter more fully described, claimed, and illustrated in the accompanying drawings, in which, Figure 1 is a side elevation of a clay working machine constructed in accordance with the preferred embodiment of my invention;

Fig. 2 is a longitudinal section thereof;

Fig. 3 is a transverse section taken on the line 3—3 of Fig. 1;

Fig. 4 is a similar section taken on the line 4—4 of Fig. 1;

Fig. 5 is a section taken on the line 5—5 of Fig. 1;

Fig. 6 is a detail perspective view of the inner section of the discharge nozzle.

Referring in detail to the drawings, 5 designates the barrel or cylinder of the machine which receives the clay or other plastic material through the nipple connection 6. A plate 7 is seated upon the internal, annular shoulder 8 formed upon the nipple 6, said plate having a central opening normally closed by a valve 9. This valve is provided with a stem 10, and a spring 11 on said stem bears at one of its ends upon a spider arm 12 on the plate 7 and at its other end against the pin 13 extending transversely through the stem 10. It will be understood that the spring 11 yieldingly holds the valve upon its seat against inward opening movement.

The barrel 5 at one of its ends has a threaded connection with a bearing casting 14. A screw 15 is movable through an opening in this casting which is disposed in coinciding relation with the axis of the barrel, and the inner end of said screw is connected to a plunger 16 working in said barrel. A worm gear 17 is arranged in the bearing casting 14 and operatively engaged upon the screw 15, said gear co-acting with the worm 18 fixed upon a shaft 19 mounted in said casting. A belt wheel or other suitable means, shown at 20, is fixed upon the shaft, whereby rotation may be transmitted to said shaft from a convenient source of power.

A filter head 21 has a detachable threaded connection, as shown at 22, with the opposite end of the barrel 5, and this end of the barrel is formed with an internal shoulder 23. A plate 24 engaged upon said shoulder has a central opening therein provided with a seat for the valve 25. This valve has a central rod or stem 26 extending through an opening in the spider arm 27. A coil spring 28 engaged upon said rod yieldingly holds the valve 25 on its seat.

The head 21 is interiorly threaded, as at 29, to receive a spider 30, said spider having a central annular portion 31 which is provided with an interiorly threaded, laterally projecting flange 32 on its outer edge. The head 21 is also formed with an interior, annular shoulder 33 and a second threaded connection 34 at the outer side of said shoulder.

The filter comprises the two concentrically arranged, spaced cylinders. The outer cylinder includes two sections 35 and 36, the inner face of the outer section 35 of said cylinder tapering longitudinally from one end to the other, and the outer face of the inner cylinder section 36 also being longitudinally tapered but in a reverse direction to the inner face of the outer section. The inner filtering cylinder likewise includes outer and inner sections 37 and 38 which are of similar construction to the sections of the outer cylinder. Between the opposed tapering faces of the sections of each filter cylinder, a continuous tubular sheet of canvas or other pervious material shown at 39, is disposed, and when the two cylinder sections are fitted together or the inner section forced longitudinally in one direction within the outer section, it will be apparent that the filtering sheet 39 will be tightly clamped and held between the inclined cylinder surfaces owing to the wedging action of the same upon the filter sheet. Each of these cylinder sections is provided with apertures, indicated at 40, extending transversely therethrough, the apertures of the sections of each cylinder being disposed in coinciding relation when the cylinder sections are assembled. The outer section of the inner filtering cylinder has threaded engagement at one of its ends with the interiorly threaded flange 32 on the spider 30, and the outer section of the other filtering cylinder has detachable engagement with the threads 34 of the filter head 21. One end of an elbow pipe or tube 41 is connected to the central opening of the spider 30 by means of the nut 42 threaded on the end of said elbow. The other end of this pipe is in communication with the port 43 provided in the head 21. This pipe 41 carries off the water filtered from the plastic material which collects within the inner filtering cylinder.

Upon the other end of the outer filtering cylinder, the outer section 44 of a tapering discharge nozzle is detachably threaded, as at 45. An inner tapering nozzle section 46 is likewise threaded upon the corresponding end of the inner filtering cylinder. These nozzle sections are each constructed preferably in the same manner as the filtering cylinder, or in other words, each section of the nozzle is provided with two co-acting parts between which the filtering sheets 47 are clamped, each of said parts being provided with preforations or apertures in a like manner to the sections of the filter cylinder. It is to be observed that the inner surface of the outer nozzle section is convergently inclined with respect to the opposed outer surface of the inner nozzle section toward the discharge or outlet end of the nozzle so that there will be a further compression of the plastic material as it passes through the annular space between these nozzle sections. The inner nozzle section is provided at its apex with a longitudinally projecting, cylindrical nose 48 and the adjacent wall of the outer nozzle section is disposed in spaced, concentric relation to this nose, as shown at 49. Thus, in the present illustrated embodiment of the invention, the plastic material will issue from the nozzle in cylindrical, tubular form.

From the above description, the operation of the machine will be readily understood. In the movement of the plunger 16 in one direction in the barrel 5, the valve 9 is opened by suction and the dough or plastic mass is drawn into said barrel. In the reverse movement of the plunger, this plastic material is forced against the valve 25, whereby said valve is opened so that the material passes beyond the same through the openings in the spider 30 and into the space between the concentric filtering cylinders. In the repeated operations of the plunger 16, a constantly increasing quantity of the plastic material is forced into the space between the filter cylinders and the pressure thus caused upon the plastic material expresses the water therethrough which passes through the apertures in the inner and outer sections of the inner and outer cylinders through the pervious filtering sheets, and then through the apertures in the other cylinder sections. As the mass is forced under pressure into the tapering chamber between the sections of the discharge nozzle, the pressure upon the material is greatly increased and there is a further filtering of the water through the apertures in the parts of the nozzle sections and the filtering sheets 47. When the material finally issues from the discharge end of the nozzle in the desired predetermined form, it is in the proper workable condition. The plastic material in this final form may be cut off into sections of desired length and may be further worked and properly shaped to produce the finished manufactured article. It is apparent, of course, that nozzle sections of various sizes may be provided and the nose 48 on the inner section may have any desired shape so that the cross-sectional form of the material as it is delivered from the machine, can be varied as desired.

From the foregoing description, taken in connection with the accompanying drawings, the construction, manner of operation and several advantages of the invention will be readily appreciated. By means of my machine, the use of a separate filter for the plastic mass and a pugging machine is obviated and the water is filtered from the material and the mass converted into blank forms or finished forms as may be desired, in one continuous operation in a single machine. Thus, a material reduction in labor and time consumed in the operation is realized and, at the same time, a more uniformly homogeneous completed article is produced. The machine likewise is of relatively simple construction and may be produced at comparatively small manufacturing cost.

While I have herein shown and described the preferred construction and arrangement of the several elements, it is to be understood that the apparatus is susceptible of considerable modification therein and I, therefore, reserve the privilege of adopting all such legitimate changes as may be fairly embodied within the spirit and scope of the invention as claimed.

Having thus full described my invention, what I desire to claim and secure by Letters Patent is:

1. In a machine of the character described, concentrically spaced filtering cylinders each consisting of two apertured sections and pervious filtering means between said sections, and means for forcing a plastic material under pressure into and through the space between said cylinders at one end of the filter.

2. In a machine of the character described, concentrically spaced filtering cylinders each consisting of two apertured sections and pervious filtering means between said sections, means for forcing a plastic material under pressure into and through the space between said cylinders at one end of the filter, and means on the opposite end of each cylinder correlated to restrict the exclusion of the material.

3. In a machine of the character described, concentrically spaced filtering cylinders each consisting of two apertured sections and pervious filtering means between said sections, means for forcing a plastic material under pressure into and through the space between said cylinders at one end of the filter, inner and outer nozzle sections on the other ends of the respective filter cylinders between which the plastic material is received and by which the exclusion of the material is restricted, and additional filtering means in each of the nozzle sections.

4. In a machine of the character described, concentrically spaced filtering cylinders each consisting of two apertured sections and pervious filtering means between said sections, means for forcing a plastic material under pressure into and through the space between said cylinders at one end of the filter and nozzle sections detachably connected to the other ends of the respective filter cylinders and having their opposed faces spaced apart and convergently inclined toward the discharge end of the cylinder to resist the exclusion of the material.

5. In a machine of the character described, inner and outer, concentrically disposed, filter cylinders each consisting of two sections having opposed, tapering surfaces extending substantially the entire length of the cylinder, a tubular, pervious filter sheet disposed between the filter sections and clamped between the tapering faces thereof, said filtering sections having a plurality of radially disposed, coinciding apertures therein, and means for forcing the plastic material under pressure longitudinally through the space between the filter cylinders.

6. In a machine of the character described, inner and outer, concentrically disposed filter cylinders each consisting of two sections having opposed, tapering surfaces extending substantially the entire length of the cylinder, a tubular, pervious filter sheet disposed between the filter sections and clamped between the tapering faces thereof, said filtering sections having a plurality of radially disposed, coinciding apertures therein, a head detachably connected to one end of the outer cylinder, a spider removably mounted in said head and provided with means for the detachable connection of the inner cylinder thereto, a barrel to receive the plastic material connected to said head, and means operating in said barrel to force the material under pressure through the space between the filter cylinders.

7. In a machine of the character described, inner and outer concentrically disposed filter cylinders each consisting of two sections having opposed, tapering surfaces extending substantially the entire length of the cylinder, a tubular, pervious filter sheet disposed between the filter sections and clamped between the tapering faces thereof, said filtering sections having a plurality of radially disposed, coinciding apertures therein, a head detachably connected to one end of the outer cylinder, a spider removably mounted in said head and provided with means for the detachable connection of the inner cylinder thereto, a barrel to receive the plastic material connected to said head, a drain pipe centrally connected at one of its ends to said spider to receive the water from the inner filter cylinder and connected at its other end to an outlet port in said cylinder head, and means operating in said barrel to force the material under pressure through the space between the filter cylinders.

8. In a machine of the character described, inner and outer filter cylinders each provided with filtering means, a head detachably connected to one end of the outer cylinder, a barrel to receive the plastic material connected to said head, a drain pipe carried by the head and connected to one end of the inner cylinder, and means operating in said barrel to force the material under pressure through the space between the filter cylinders.

9. In a machine of the character described, inner and outer cylinders each provided with filtering means, a head detachably connected to one end of the outer cylinder, means removably mounted in said head and supporting the corresponding end of the inner cylinder, a drainage pipe for the inner cylinder connected to said supporting means, and means connected to said head including pressure applying means to force the plastic material through the space between said cylinders.

In testimony whereof I hereunto affix my signature in the presence of two witnesses.

EDWARD E. BROWN.

Witnesses:
ADOLPH GREINER,
JOHN J. DELANEY.

Copies of this patent may be obtained for five cents each, by addressing the "Commissioner of Patents, Washington, D. C."